Jan. 12, 1965   W. SCHRÖDER   3,164,961
HYDRODYNAMIC FLUID FLOW MACHINE
Filed July 27, 1962
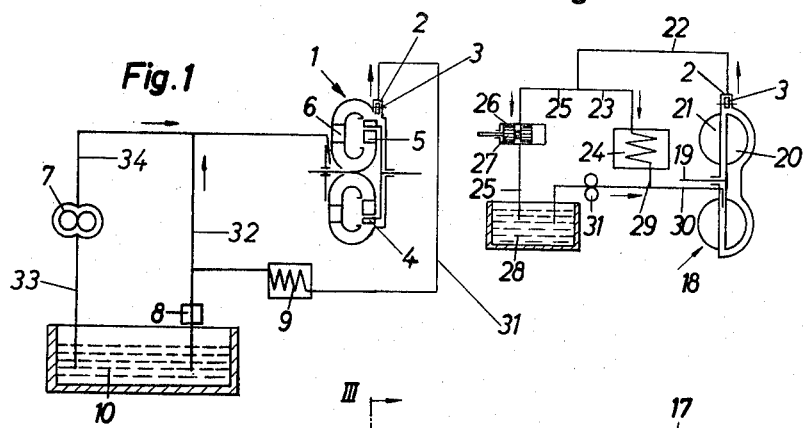
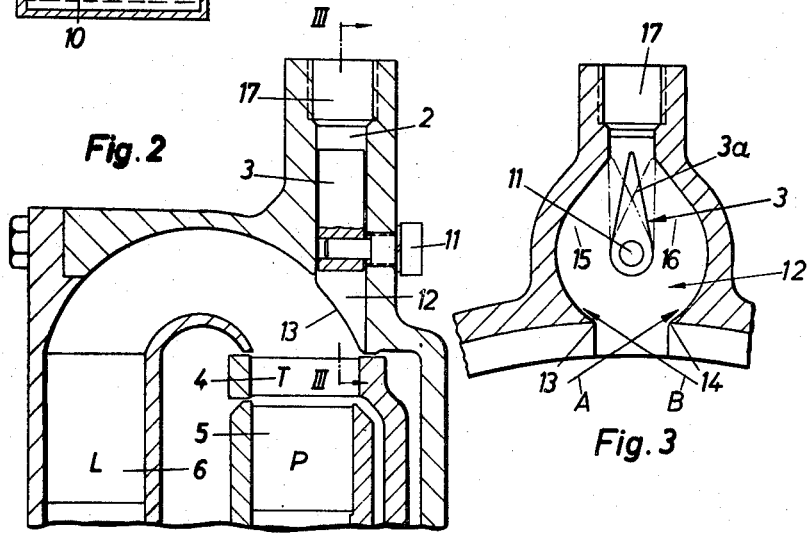

United States Patent Office 3,164,961
Patented Jan. 12, 1965

3,164,961
HYDRODYNAMIC FLUID FLOW MACHINE
Walter Schröder, Essen, Germany, assignor to Voith-Getriebe KG., Heidenheim (Brenz), Germany
Filed July 27, 1962, Ser. No. 212,965
Claims priority, application Germany, Aug. 3, 1961, B 63,508
8 Claims. (Cl. 60—54)

The present invention relates to hydrodynamic fluid flow machines. Hydrodynamic fluid flow machines such as torque converters (so-called Föttinger torque converters), fluid couplings and fluid brakes for higher outputs have to be provided with a cooling and/or control circuit branched-off from the working circuit in order to make possible effectively to conduct away the heat developed in the working circuit and to permit a fluid flow control.

With heretofore known hydrodynamic fluid flow machines equipped with an outer circuit of the above-mentioned type, such outer circuit is equipped with a special gear pump for circulating the working fluid to be cooled and/or to be controlled. Inasmuch as such pump, which has to take care of the entire circulation of the working fluid with its drive necessitates considerable additional costs, and space and also represents an additional weight, attempts have been made, in order to produce a pressure drop in the cooling circuit, to take advantage of the pressure-head of the working circuit circulated in a torque converter circuit. Such an arrangement, however, brings about the difficulty that the direction of flow of the working fluid in the converter circuit greatly varies in conformity with the varying speed ratio between turbine wheel and pump wheel of the converter. If, in order to take this situation into consideration, a plurality of bores were provided in different directions at the respective branch points of the transmission housing, a favorable exploitation of the pressure-head would be possible only for the corresponding limited number of speed ratios. Moreover, it would be necessary always to close all bores except the respective bore involved for the respective conditions.

It is, therefore, an object of the present invention to provide an arrangement which will overcome the above-mentioned drawbacks.

It is another object of this invention to provide a hydrodynamic fluid flow machine with an outer circuit in such a way that the pressure-head of the working fluid in the hydrodynamic working circuits will be taken advantage of for producing or improving the outer cooling and/or control circuit without encountering the difficulties outlined above.

These and other objects and advantages of the invention will appear more clearly from the following specification in connection with the accompanying drawing, in which:

FIGURE 1 diagrammatically illustrates a torque converter with circuits required for the working fluid;
FIGURE 2 illustrates on a somewhat larger scale than FIGURE 1 an axial section through a portion of the converter with the branching-off portion;
FIGURE 3 is a section along the line III—III of FIGURE 2;
FIGURE 4 diagrammatically illustrates a fluid brake with an outer cooling and control circuit.

The arrangement according to the present invention is characterized primarily in that the branching-off portion for the outer circuit in the working circuit housing is designed, for instance as pear-shaped chamber in such a way that the working fluid flow to be branched off will, over the entire range of the occurring speed ratios, enter the outer circuit in as shock-free a manner as possible.

According to a further development of the invention, a flap valve with freely tiltable and preferably streamlined flap is arranged in the pear-shaped chamber of the branching-off portion. In this way, the branching-off passage is subdivided into two sections while the formation of closed whirls in this area, will be prevented.

Moreover, the outer circuit will expediently in a manner known per se, be branched off from the hydrodynamic working circuit at an area where a relatively high static pressure prevails and will be returned to said working circuit at an area where a relatively low static pressure prevails. With a working circuit with a one-stage turbine wheel, the branching-off area may be located, for instance when looking in flow direction, directly behind the turbine wheel.

Referring now to the drawing in detail, the arrangement shown in FIG. 1 comprises a torque converter 1 the housing of which comprises a branching-off section 2 for the cooling circuit. This branching-off section 2 is designed in the form of an approximately pear-shaped chamber or cavity 12. In approximately the central portion of said chamber 12 there is provided a flap valve 3 with a flap 3a freely tiltable about a bolt 11 and adapted to adjust itself automatically in conformity with the direction of the flow. The reference numerals 4, 5 and 6 and letters T, P and L designate blading rings of the turbine, pump, and guide wheel ring of converter 1, the turbine constituting the output bladed wheel means and the pump the input bladed wheel means. The arrangement furthermore comprises a gear pump 7 for producing and maintaining the superatmospheric pressure in converter 1. A heat exchanger 9 is provided in the outer cooling circuit for the working fluid.

The angles at the entrance edges 13 and 14 of the pear-shaped chamber or cavity 12 correspond to the fluid flow directions indicated by arrows in FIG. 3 and prevailing in the working chamber of the converter at the limits of the torque converter operational range, for instance when starting (A) and when hydraulically braking (B). Flap 3 subdivides the chamber 12 into the two sections 15 and 16. Depending on the direction of flow of the working fluid to be branched-off, said working fluid will either pass through section 15 or through section 16, or through both simultaneously into an exit opening 17 and from there into the cooling circuit 31, 9, 32, reservoir 10, 33, pump 7, and conduit 34.

FIG. 4 illustrates a working circuit in form of a fluid brake 18 which is provided with a brake shaft 19, a rotating and a stationary blading 20, 21 respectively. In the brake construction in this modification, the rotating blading forms the input bladed wheel means and the stationary blading forms the output bladed wheel means. The branching-off section 2 of the outer circuit with flap 3 is designed in the manner described in connection with FIGS. 2 and 3. A conduit 22 leading off from the branch section 2 leads on one hand through a conduit 23 to a heat exchanger 24, and on the other hand leads to a reservoir 28 through a conduit 25 having interposed therein a filling control valve 26. The filling control valve 26 comprises a piston 27 which may be adjustable manually or in any other desired manner and the axial adjustment of which will vary the free cross-section of conduit 25 and thereby the quantity of working fluid flowing off the brake per time unit. From the reservoir 28, a conduit 30 leads back through a gear pump 31 to the working chamber of brake 18. A conduit 29 communicating with the heat exchanger 24 leads into conduit 30 between pump 31 and brake 18.

As will be evident from the above, by exploiting the pressure-head in conformity with the present invention, a special circulating pump will be superfluous with the outer cooling circuit 22, 23, 24, 29 and 30 if the quantity of heat to be conducted away, is not considerable. At least, if a circulating pump is to be provided for the cooling circuit, a pump for a considerably smaller output will suffice. The control circuit 22, 25, 38 and 30 illustrated in the drawing comprises a pump 31. However, this pump together with valve 26 is required merely for changing the filling, and, therefore, can be of a correspondingly lower output than would be necessary if it would also have to circulate the cooling fluid, and such pump may furthermore be turned off if the filling is not to be changed.

It is, of course, to be understood that the present invention is, by no means, limited to the particular construction shown in the drawing, but also comprises any modifications within the scope of the appended claims.

What I claim is:

1. A rotary hydrodynamic fluid flow machine, which comprises: housing means confining a substantial torodial working chamber for the working fluid of said machine, input and output bladed wheel means in said chamber coacting with the working fluid in the chamber to cause the said working fluid to travel in a substantially helical flow path including circumferential components in either of two directions in said working chamber during operation of the machine, branch conduit means branching off from said working chamber at a first point in the radially outer region of said working chamber and returning along a path external of the working chamber to a second point of the working chamber nearer the axis of the machine than said first point and at a lower pressure than said first point whereby the pressure of the working fluid in said working chamber in the region of said first point is operable to cause flow of the working fluid in said conduit means from said first point toward said second point, the inlet end of said conduit means at said first point comprising a cavity formed in said housing means and having inner wall surfaces, said cavity having an inlet at the radially inner side thereof opening into said working chamber and having an outlet at the radially outer side thereof, said inner wall surfaces of said cavity including two side wall surfaces which are spaced from each other in a plane normal to the axis of rotation of the machine and end wall surfaces spaced in the axial direction of said machine and joining said side wall surfaces to form the said cavity, said side wall surfaces being concave toward the center of the cavity and each side wall surface having that portion which is adjacent said inlet inclined with respect to a plane passing through said inlet and the axis of the machine substantially in one of the two directions of circumferential flow of fluid in the working chamber within range of the opening.

2. A hydrodynamic machine according to claim 1 which includes; flap valve means freely pivotally mounted in the region of the center of said cavity, the pivot axis of the flap valve means extending in a direction parallel to said machine axis, said flap valve means extending substantially from one of said end wall surfaces to the other of said end wall surfaces of said cavity in the direction of said pivot axis and having a longer side extending from said pivot axis to said outlet whereby said flap valve means is movable about the pivot axis automatically in response to the direction of flow of said working fluid from said working chamber through said cavity to move into one of a plurality of possible positions which at the respective prevailing conditions will assure as shock-free a passage of fluid as possible through said cavity.

3. A hydrodynamic machine according to claim 2 wherein said flap valve means in cross section is substantially the shape of a hydrofoil with a blunt rounded edge at the end thereof toward said inlet and tapering inwardly to a relatively sharp edge at the end thereof toward said outlet.

4. A hydrodynamic machine according to claim 3 wherein the end of said flap valve means in each extreme position thereof engages one of said side wall surfaces adjacent said outlet.

5. A hydrodynamic machine according to claim 1 wherein said cavity is substantially pear shaped in cross section in a plane perpendicular to the axis of rotation of the machine with the larger end of the cavity adjacent said inlet.

6. A hydrodynamic machine according to claim 1 wherein said cavity is located directly behind said turbine wheel means when looking in the direction of flow of said working fluid at said turbine wheel means.

7. A hydrodynamic machine according to claim 1 wherein said cavity is symmetrical with respect to a plane containing the axis of rotation of the machine and extending through the center of the cavity.

8. A hydrodynamic machine according to claim 1 wherein said input and output bladed wheel means are pumping and turbine wheel means, respectively, said machine including a flap valve means between said side wall surfaces movable by fluid flow against either of said side wall surfaces to direct said flow to said outlet.

References Cited in the file of this patent
UNITED STATES PATENTS
2,558,976    O'Leary _____ July 3, 1951